United States Patent [19]

Dorrn

[11] Patent Number: 4,577,998
[45] Date of Patent: Mar. 25, 1986

[54] PRODUCTION OF PVC IRRIGATION PIPE AND THE PIPE SO PRODUCED

[75] Inventor: Clive Dorrn, Bedfordshire, England

[73] Assignee: Imperial Chemical Industries, PLC, London, England

[21] Appl. No.: 432,675

[22] Filed: Oct. 4, 1982

[30] Foreign Application Priority Data

Oct. 22, 1981 [GB] United Kingdom ............... 8131949

[51] Int. Cl.⁴ .................... A01G 25/02; B29C 67/22; B29C 55/22
[52] U.S. Cl. ........................ 405/45; 264/54; 264/209.5; 264/211; 264/321; 264/DIG. 8; 264/DIG. 13; 405/36; 405/43; 425/325; 425/817 C
[58] Field of Search .......... 264/54, DIG. 8, DIG. 13, 264/209.5, 211, 321; 425/325, 817 C; 405/45, 43, 36

[56] References Cited

U.S. PATENT DOCUMENTS

| | | | |
|---|---|---|---|
| 2,807,505 | 9/1957 | Weitzel | 299/104 |
| 3,300,366 | 1/1967 | Krolik, Jr. | 264/DIG. 8 |
| 3,403,203 | 9/1968 | Schirmer | 264/DIG. 8 |
| 3,539,666 | 11/1970 | Schirmer | 264/DIG. 8 |
| 3,634,564 | 1/1972 | Okamoto et al. | 264/DIG. 8 |
| 3,874,965 | 4/1975 | Greenwald et al. | 264/DIG. 8 |
| 3,954,928 | 5/1976 | Omori et al. | 264/DIG. 8 |

FOREIGN PATENT DOCUMENTS

| | | | |
|---|---|---|---|
| 1629423 | 1/1971 | Fed. Rep. of Germany . | |
| 971567 | 9/1964 | United Kingdom | 264/49 |
| 1100727 | 1/1968 | United Kingdom | 264/54 |
| 1237097 | 6/1971 | United Kingdom | 264/54 |
| 1393680 | 5/1975 | United Kingdom | 264/54 |
| 1554373 | 10/1979 | United Kingdom | 264/54 |

Primary Examiner—Philip Anderson
Attorney, Agent, or Firm—Cushman, Darby & Cushman

[57] ABSTRACT

Process for producing flexible PVC irrigation pipe by extruding a plasticized PVC composition containing a melt strength-enhancing aid and a chemical blowing agent and (a) the extruded melt being expanded by foaming thereof immediately on leaving the die into a substantially closed-cell extrudate of outer diameter greater than the die orifice with the extrudate surfaces being substantially unpunctured, (b) drawing down the extrudate in the atmosphere causing rupturing of the foam cell walls of the extrudate to form a substantially open-cell extrudate having punctured surfaces, and (c) when the extrudate has been drawn down to a degree which is prior to any cellular collapse which would lead to the formation of water-impervious pipe, cooling the extrudate by passing it through a cooling means in order to prevent said collapse. Preferably the extrudate passes through a tubular guide into a water bath in step (c). The pipe thus produced is suitable for irrigation applications and may be used for long periods without exhibiting an unacceptable decrease in water-permeability.

9 Claims, 1 Drawing Figure

PRODUCTION OF PVC IRRIGATION PIPE AND THE PIPE SO PRODUCED

The present invention relates to a process for producing flexible PVC pipe suitable for irrigation applications and to the pipe made using this process.

It has been proposed to use water-permeable foamed PVC piping for irrigation purposes whereby the intention is that water passing through the pipe should seep outwardly through the interconnected foam cells of the pipe to provide a continuous trickle of irrigating water. One proposed method to produce such pipe involves extruding a PVC formulation containing a blowing agent which is sufficiently activated under the conditions of the extrusion such that the extrudate foams while emerging from the extruder die to provide extruded foamed pipe having sufficient intercellular connections between the internal and external surfaces for it to be water-permeable and therefore purportedly suitable for irrigation purposes.

I have investigated this technique for the production of flexible PVC piping, i.e. pipe produced from a plasticised PVC formulation, and have encountered serious problems. Thus I have found that if one uses extruder temperature conditions which are sufficiently severe to activate the blowing agent to a degree necessary to induce appropriate intercellular connections (and hence permeability) in the resulting pipe, then the pipe tends to disintegrate (usually by splitting into strips) on leaving the die; if one attempts to overcome this problem by using less severe extruder conditions, then the foamed extruded pipe simply tends to be relatively impervious to water. While I have discovered that this problem may in fact be overcome by incorporating a suitable melt-strength enhancing aid into the plasticised PVC formulation, still another problem exists which is not so immediately apparent. This is that the water-permeability of the pipe, even if acceptably high at first, invariably drops drastically (often to virtually zero) after a prolonged period of time (say about one week to a month) during which water is continuously or intermittently passed through the pipe. Since prolonged continuous or intermittent usage of the pipe for irrigation would be essential for the growing of crops and flowers, it is clear that such a defect would render the pipe quite useless from a practical viewpoint.

I have now discovered a process for the production of water-permeable flexible PVC pipe from a plasticised PVC formulation which pipe is suitable for irrigation applications and does not lose its water-permeability to an unacceptable extent after a prolonged period of continuous or intermittent use.

Figure 1:
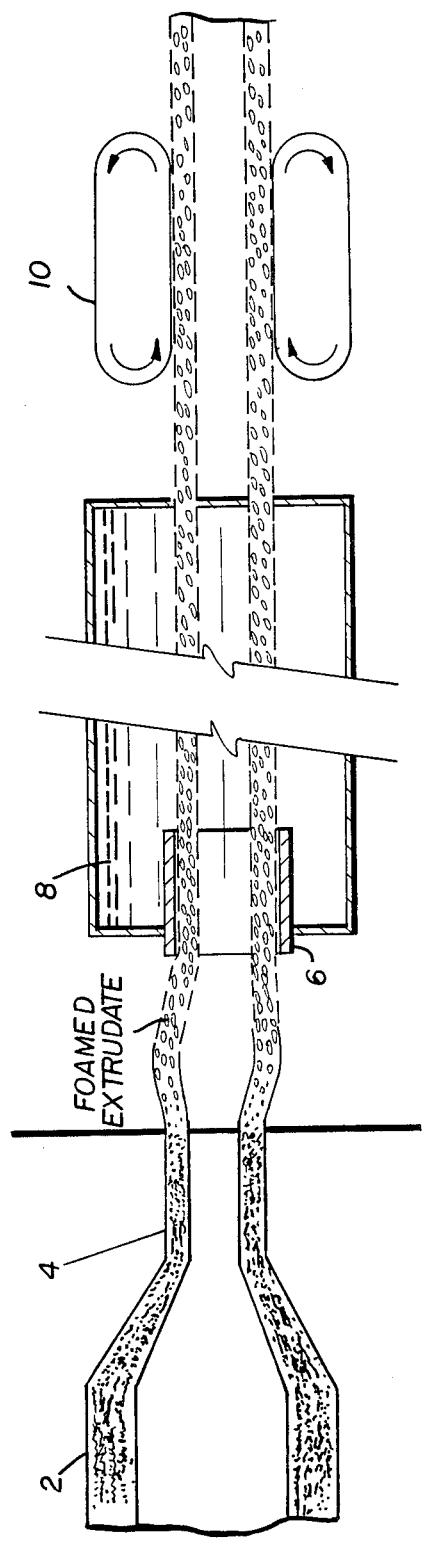
FIG. 1 illustrates the process of the present invention.

According to the present invention (see FIG. 1) is provided a process for producing water-permeable flexible PVC pipe suitable for irrigation applications which process comprises extruding a plasticised PVC composition, containing a melt strength-enhancing aid and a chemical blowing agent sysem, using an extruder 2 equipped with a pipe-forming die 4, wherein said extrusion comprises (a) the extruded melt being expanded by foaming thereof immediately on leaving the die 4 into a substantially closed-cell extrudate of greater outer diameter than the outer diameter of the die 4, exit orifice with the surfaces of the extrudate being substantially unpunctured, said expansion being into the surrounding atmosphere, (b) drawing down the extrudate in the atmosphere to causing rupturing of the foam cell walls of the extrudate to form a substantially open-cell extrudate having punctured surfaces, and (c) when the extrudate has been drawn down in the atmosphere to a degree which is prior to any cellular collapse which would lead to the formation of substantially water-impervious pipe, cooling the extrudate by passing it through a cooling means in order to prevent said collapse.

There is also provided according to the invention water-permeable PVC pipe suitable for irrigation applications which is produced by a process as defined above.

(The word "puncturing" in this specification is of course used in the sense of forces activated within the extrudate itself causing the surfaces thereof to become perforated, and not in the sense of the surfaces being perforated by the application of a sharp object.)

The pipe-forming die 4 is normally an annular die whereby the pipe so produced has an annular cross-section; however it is conceivable that pipe-forming dies giving tubular profiles which are other than annular could be employed.

In the process of the invention, essential constituents of the extruded plasticised PVC composition are a melt strength-enhancing aid and a chemical blowing agent system, both of these ingredients being required for effecting step (a) of the process. Thus in step (a), it is necessary to employ a combination of the temperature conditions of the extruder, the blowing agent system, and the melt-strength enhancing aid to cause the extruded melt immediately on leaving the die to foam and expand by virtue of released gas from the blowing agent system into a substantially closed-cell extrudate of greater outer diameter than the outer diameter of the die exit orifice with the surfaces (external and internal) of the extrudate being substantially unpunctured.

The chemical blowing agent system is required so that, under the conditions of the extrusion, the extruded melt immediately on leaving the die expands by virtue of released gas from the blowing agent system. Accordingly the temperature conditions of the extruder must be selected in accordance with the blowing agent system being used such that the extrudate expands as described. Generally speaking, the temperature conditions of the extruder, in order to achieve such an effect, will need to be such that the composition before extrusion through the die is at a considerably higher temperature than would normally be used to obtain a non-foamed plasticised PVC pipe extrudate from the same composition minus the blowing agent system (typically 140° C. to 155° C. for the production of such non-foamed extrudates), usually at least 20° C. higher and typically 30° C. higher.

The melt strength-enhancing aid in the PVC composition, in conjunction with an appropriate combination thereof with the extruder temperature conditions and the blowing agent system, is required in order that the expanded extruded melt in step (a) (besides of course not undergoing disintegration) has sufficient mechanical strength for its cellular structure to remain substantially unbroken and its surfaces (external and internal) substantially unpunctured by the gas from the blowing agent immediately on leaving the die. On the other hand, the melt strength-enhancing aid must not prevent rupturing during the drawing down in step (b). If the cellular structure of the extruded melt is in fact substantially broken and the extrudate surfaces substantially punctured by the gas from the blowing agent immediately on leaving the die (the extrudate thereby undergoing little or no swelling), the resulting pipe while being initially water-permeable exhibits a drastic fall in water permeability after a period of use during which water is continuously or intermittently passed through the pipe.

Accordingly, a combination of extruder temperature conditions, blowing agent system (which can vary in type and amount) and melt strength-enhancing aid (which can vary in type and amount) must be selected for the purpose of effecting step (a) (with the melt strength-enhancing aid constituent also being selected bearing (b) in mind). Such a selection may be determined by experiment and effective and ineffective combinations are illustrated in the Examples.

In step (b) of the process of the invention, by "drawing down" is meant that the pipe is hauled off at a greater speed than that with which it would tend to emerge naturally from the extruder (given the extruder conditions, particularly screw speed, being employed) so that the tubular extrudate is axially drawn or, in other words, stretched; this of course reduces the diameter of the extrudate. The drawing-down may be achieved by using suitable haul-off equipment, for example a caterpillar track system 10 comprising two tracked moving belts frictionally gripping the pipe from above and below and moving at a faster speed than the natural emergant speed of the extrudate. The tensile forces generated in this stage rupture the extrudate cell-wall structure, and the extrudate surfaces (internal and external) are punctured with release of gas from the extrudate (probably both the tensile forces of the draw-down occurring in the surface regions and the release of the internal gas pressure caused by rupturing the internal cellular structure contributing to this puncturing). This converts the essentially closed cell non-porous extrudate from step (a) (i.e. an extrudate with most of the cells being unconnected) into an open-cell porous extrudate in step (b) (i.e. an extrudate with most of the cells being interconnected and having permeable surfaces). The amount of draw-down required to induce acceptable porosity (and this of course may be determined experimentally according to the various factors being employed, such as extruder conditions, PVC formulation, and required degree of water-permeability) is less than might be expected since the process of foam expansion in step (a) and cell wall rupturing in step (b) rapidly follow each other, thereby allowing some of the gas generated from the blowing agent to escape through the punctured surface before it can be used fully to expand the melt extrudate. Thus, immediately on leaving the die, the expansion of the extrudate occurs with virtually no puncturing of the surface, but within a short distance the loss of gas through the surface becomes noticeable as the extrudate stops swelling and begins to decrease in diameter.

The degree of draw down of the extrudate before cooling in step (c), whereby the extrudate is drawn down to a degree which is prior to any cellular collapse which would lead to the formation of water-impervious pipe, is determined from a practical viewpoint (for a given haul-off rate) by the distance of the cooling means from the die orifice. Thus this distance should not be too large otherwise the ruptured cellular structure of the extrudate, principally in the surface regions, will start to collapse because the extrudate will still be at a high temperature in view of the very high extrusion temperature needed for step (a) - leading to the formation of substantially water-impermeable pipe. The cooling means effectively "freezes" the water-permeable cellular structure of the extrudate and prevents any such collapse.

The degree of draw down before cooling (determined by the distance of the cooling means from the die orifice for a given haul-off rate) is in step (c) also preferably such that the outer diameter of the extrudate is at a preselected value which is greater than the outer diameter of the die exit orifice. Although it is within the scope of this invention to draw down the extrudate so that the outer diameter of the extrudate is equal to or smaller than the outer diameter of the die exit orifice before cooling, the resulting pipe is often somewhat too porous for certain irrigation applications which require a reasonably slow radial seepage of water through the pipe.

The cooling means will normally be a cooling bath 8, conveniently a water bath (although no doubt other coolants could be used), and it is preferable that the extrudate enters the cooling bath 8 through a guide 6 (preferably projecting into the cooling bath 8), the guide 6 being a cylindrical tube in the case of an annular die; such a guide 6 can usefully be provided by a conventional sizing box as would be employed in a conventional pipe extrusion. The guide 6 is useful in that it can be employed to effectively seal off the contents of the cooling bath 8 from the surrounding atmosphere so as to prevent leakage from the bath 8 at the position of entry of the pipe. Additionally, if the preferment discussed in the preceding paragraph is being employed, an extrudate outer diameter of preselected value (which is greater than the outer diameter of the die exit orifice) can be consistently maintained by ensuring that the extrudate does in fact pass snugly through a guide 6 having an inner diameter substantially equal to the preselected outer extrudate diameter.

In the process of the invention, the surrounding atmosphere is conveniently the ambient air, although no doubt other surrounding atmospheres (such as nitrogen or carbon dioxide) could also be used.

The PVC pipe produced by the process of the invention should preferably allow an initial seepage of water through its walls at 1 bar water pressure of at least 1 liter/meter length/hour, and particularly preferably 10 to 200 liters/meter length/hour.

Suitable melt strength-enhancing aids for use in the process of the invention include certain materials normally thought of as PVC processing aids, such as the well-known acrylic processing aids (e.g. 'Diakon' APA 1 made by ICI and 'Paraloid' K 120N made by Rohm and Haas).

The chemical blowing agent system used in the invention may be a single blowing agent, or more preferably a combination of different blowing agents (in order for the requirements of step (a) to be more readily achieved). A chemical blowing agent is a material which undergoes chemical decomposition when heated at an elevated temperature to yield a gas. Examples of blowing agents include the carbon dioxide-liberating blowing agents e.g. carbonates or bicarbonates, and, more preferably, the nitrogen-liberating blowing agents e.g. azo, hydrazo and nitroso organic compounds such as azodicarbonamide, dinitrosopentamethylene tetramine and p,p'-oxy-bis(benzene sulphonylhydrazide).

Examples of suitable plasticisers for use in the invention include esters of polycarboxylic acids such as phthalic acid, isophthalic acid, terephthalic acid, adipic acid, azalaic and sebacic acid. Phosphoric esters, such as trioctyl phosphate, tricresyl phosphate, tritolyl phosphate and trixylyl phosphate; polyester plasticisers such as polypropylene laurate, soya bean oil derived plasticisers such as epoxidised soya bean oil, and chlorinated paraffins may also be used. Particularly suitable plasticisers include the $C_2$–$C_{14}$ alkyl esters of dicarboxylic acids, examples of which include dibutyl phthalate, dihexyl phthalate, dioctyl phthalate, di-iso-octyl phthalate, dinonyl phthalate, a mixture of C7-9 dialkyl phthalates, ditridecyl phthalate, butyl benzyl phthalate, dibutyl adipate, dihexyl adipate, doctyl adipate, di-iso-octyl adipate, dibutyl sebacate and dioctyl sebacate. The phthalic acid esters are the most preferred plasticisers. In a plasticised PVC composition, the plasticiser is normally used in an amount of at least 20 parts by weight based on the weight of PVC.

The plasticised PVC composition used in the process of the invention may also contain other commonly used additives such as stabilisers, lubricants, dyes, pigments, and impact modifiers.

By "PVC" in this specification is meant a vinyl chloride homopolymer, a copolymer of vinyl chloride with one or more comonomers copolymerisable therewith, or a graft polymer formed by polymerizing vinyl chloride in the presence of a preformed polymer. Preferably the PVC should contain at least 50 mole %, and more preferably at least 80 mole %, of units derived from vinyl chloride.

The present invention is now illustrated by the following Examples. Unless otherwise specified all parts and percentages are by weight.

EXAMPLE 1

A PVC composition having the following formulation was prepared.

| | |
|---|---|
| 'Corvic' S67/111 (ICI; vinyl chloride homopolymer of K-value 67 as determined from relative viscosity data obtained by method ISO-R174) | 100 parts |
| Tribasic lead sulphate powder (stabiliser) | 5 parts |
| Diisooctyl phthalate (plasticiser) | 50 parts |
| Calcium stearate (lubricant) | 1 part |
| 'Diakon' APA 1 (ICI; acrylic processing aid used as melt strength-enhancing aid) | 5 parts |
| Azodicarbonamide ('Genitron' EPA; Fisons; blowing agent) | 1 part |
| p,p'-Oxy-bis(bensenesulphonylhydrazide) ('Genitron' OB; Fisons; blowing agent) | 1 part |
| Titanium dioxide (pigment) | 0.5 part |
| Carbon black (pigment) | 0.02 part |

The above formulation, except for the blowing agents and plasticiser, were powder blended in a high speed mixer, the mixture being heated during blending. When the temperature reached 80° C., half the plasticiser was added (thereby cooling the blend), and when the temperature again reached 80° C. the rest of the plasticiser was added. When the temperature reached 120° C., the mixture was cooled to 60° C. when the two blowing agents were added. After a further two minutes of mixing, the mixture was discharged.

The composition was extruded with drawing-down on a 1.25 inch Betol extruder fitted with a 3:1 compression screw and a conventional annular pipe-forming die (outer orifice diameter 9.52 mm, central mandrel diameter 6.35 mm). The screw speed employed was 25 rpm and the line speed (i.e. the haul-off rate) was 3 meters/minute, the drawing-down being achieved using caterpillar track haul-off equipment (tracked moving belts frictionally moving the pipe from above and below at a faster rate than the initially emerging extrudate). The temperature profile of the extruder was as follows:

| 155° C./175° C./175° C./ | 180° C. |
|---|---|
| Barrel | Head |

The extrudate was seen to expand immediately on leaving the die orifice without the external surface being punctured (examination of some samples of extrudate frozen at this stage by premature cooling showed the internal surface also to be unpunctured and the cell structure to be substantially closed-cell); as the extrudate progressed beyond the immediate vicinity of the die orifice, the external surface was seen to become punctured with escape of gas from the extrudate. The extrudate was allowed to pass 100 mm (while decreasing in diameter) through the surrounding air (at which stage the extrudate cellular structure had not started to collapse) before passing through a cooling water bath to freeze the cellular structure. The extrudate entered the water bath by passing snugly through a cylindrical guide projecting into the bath (in fact the guide was a sizing box as used for conventional extrusions) having an inner diameter of 10 mm (i.e. about 0.5 mm larger than the outer orifice diameter of the die). The pipe produced had an open-cell porous structure with the cell wall structure having been ruptured and both internal and external surfaces having been punctured during the drawing-down.

The resulting pipe was water-permeable, having an initial water seepage rate at 1 bar water pressure of about 44 liters/meter length/hour. The pipe was put under test for about 11 days (water being passed continuously through the pipe via a 100 micron filter) during which time the water seepage rate at 1 bar water pressure decreased only to 36 liters/meter length/hour, giving a projected life well in excess of a year.

Several hundred meters of this pipe were supplied for installation in the greenhouses in Hyde Park (Kensington, London) for evaluation under realistic trial conditions. To date (after 28 months in operation) 72% of the pipe is still operating successfully; over 90% was operational after 16 months.

EXAMPLE 2 (COMPARATIVE)

The procedure of Example 1 was substantially repeated, except that the formulation contained 2 parts of each of the two blowing agents and the screw speed of the extruder was 30 rpm. As a result of changing the blowing agent quantity in this way, the surface of the extrudate immediately leaving the die orifice could be seen to be punctured, and no swelling of the extrudate was observed. There was no drawing-down in this case, the speed of initially emerging extrudate being substantially equal to the speed of the caterpillar belts. The extrudate just passed through the sizing box used in Example 1 into the cooling bath (having again been allowed to pass 100 cm through the air).

The resulting pipe was water-permeable. When tested as in Example 1 it had an initial water seepage rate using 1 bar water pressure of 5.6 liter/meter length/hour, which fell to 0.2 liter/meter length/hour after 11 days continuous testing.

EXAMPLE 3 (COMPARATIVE)

The procedure of Example 2 was substantially repeated except that the blowing agent system of the formulation used consisted of 2 parts of azodicarbonamide only. As in Example 2, the surface of the extrudate was already punctured on leaving the die orifice, no swelling or subsequent drawing-down occurring.

The resulting pipe was just water-permeable. When tested as in Example 1 it had an initial water seepage rate using 1 bar water pressure of 2.7 liter/meter length/hour. This dropped to nearly zero after a few days of continuous use.

EXAMPLE 4 (COMPARATIVE)

The procedure of Example 2 was substantially repeated, except that the blowing agent system of the formulation used consisted of 4 parts of azodicarbonamide only. As in Examples 2 and 3, the surface of the extrudate was already punctured on leaving the die, no swelling or subsequent drawing-down occurring.

The resulting pipe was water-permeable. When tested as in Example 1 using 1 bar water pressure it had an initial water seepage rate of 5.6 liters/meter length/hour which fell to 0.3 liters/meter length/hour after 11 days continuous testing.

EXAMPLE 5

The procedure of Example 1 was substantially repeated except that thicker-walled pipe was made, the conventional annular die outer diameter being 11.1 mm and the central mandrel diameter again being 6.35 mm; the inner diameter of the sizing box was 12.2 mm (the die to cooling bath distance again being 100 mm). Because the thicker pipe wall would reduce the linear output rate, the screw speed was increased to 30 rpm and the line speed set at 2.35 meters/minute.

The extrudate was drawn-down and behaved as in Example 1, expanding immediately on leaving the die orifice with the surfaces being unpunctured and the cellular structure being unruptured. Away from the die, the surface of the extrudate was seen to puncture and the pipe diameter decrease before snugly passing through the sizing box into the cooling bath. The resulting opencelled pipe had an initial water seepage rate at 0.5 bar water pressure of about 75 liters/meter length/hour (probably corresponding to about 150 liters/meter length/hour at 1 bar water pressure), and again showed only a relatively small fall in water seepage rate with increasing time of continuous use.

Lengths of this pipe were also installed in Hyde Park (Kensington, London) where, after 17 months in trial service they are still operating without giving any problems.

EXAMPLE 6 (COMPARATIVE)

A PVC composition having the following formulation was prepared.

| | |
|---|---|
| 'Corvic' S67/111 (ICI; vinyl chloride homopolymer of K-value 67 as determined from relative viscosity data obtained by method ISO-R174) | 100 parts |
| Tribasic lead sulphate powder (stabiliser) | 5 parts |
| Diisooctyl phthalate (plasticiser) | 50 parts |
| Calcium stearate (lubricant) | 1 part |
| 'Diakon' APA 1 | 5 parts |
| Sodium bicarbonate (blowing agent) | 8 parts by weight |
| Citric acid (nucleating agent) | 1 part by weight |
| Titanium dioxide (pigment) | 0.5 parts by weight |
| Carbon black (pigment) | 0.02 parts by weight |

The above formulation (without the sodium bicarbonate and citric acid) was powder blended in a high speed mixer, the mixture being heated during blending to 120° C. and then cooled, the sodium bicarbonate and citric acid being added at 60° C. on the cooling part of the cycle.

The composition was extruded on a 1.25 inch Betol extruder fitted with a 3:1 compression screw and a conventional annular pipe-forming die (outer orifice diameter 19 mm, central mandrel diameter 14.3 mm. The screw speed employed was 30 rpm and the line speed feet/minute. The temperature profile of the exturder was as follows:

| 155° C./175° C./175° C./ | 180° C. |
|---|---|
| Barrel | Head |

The surface of the extrudate was seen to be already punctured on leaving the die orifice, no swelling being observed. The extrudate passed 100 mm in the air, then through a cylindrical sizing box (internal diameter about 20 mm) into a cooling bath and then through a caterpillar track system - although there was no drawing-down as the belt speed and emergant extrudate speed were substantially the same.

The resulting pipe was water-permeable and when tested as in Example 1 had an initial water seepage rate of 35 liter/meter length/hour at 1 bar water pressure, which fell to 8.3 liter/meter length/hour after 13 days continuous testing.

EXAMPLE 7 (COMPARATIVE)

The extrusion procedure of Example 6 was adopted save that the 'Diakon' APA1 was omitted in the PVC formulation. The extrudate was observed to disintegrate into strips on leaving the die.

I claim:
1. A process for producing water-permeable flexible PVC pipe suitable for irrigation applications which process comprises extruding a plasticised PVC composition, containing a melt strength-enhancing aid and a chemical blowing agent system, using an extruder equipped with a pipe-forming die, wherein said extrusion comprises
   (a) the extruded melt being expanded by foaming thereof immediately on leaving the die into a substantially closed-cell extrudate of greater outer diameter than the outer diameter of the die exit orifice with the surfaces of the extrudate being substantially unpunctured, said expansion being into the surrounding atmosphere,
   (b) drawing down the extrudate in the atmosphere causing rupturing of the foam cell walls of the extrudate to form a substantially open-cell extrudate having punctured surfaces, and (c) when the extrudate has been drawn down in the atmosphere to a degree which is prior to any cellular collapse which would lead to the formation of substantially water-impervious pipe, cooling the extrudate by passing it through a cooling means in order to prevent said collapse.

2. A process according to claim 1 wherein the die used is an annular die which yields pipe of annular cross section.

3. A process according to claim 1 wherein in step (c), the extrudate is drawn down in the atmosphere to a preselected outer diameter which is greater than the outer diameter of the die exit orifice.

4. A process according to claim 1 wherein in step (c), the cooling means is a cooling bath.

5. A process according to claim 4 wherein in step (c), the extrudate enters the cooling bath through a guide, the guide being a cylindrical tube in the case of using an annular die.

6. A process according to claim 4 wherein in step (c) the extrudate enters the cooling bath through a guide and is drawn down to a preselected outer diameter which is greater than the outer diameter of the die exit orifice, the inner diameter of the guide being substantially equal to the preselected outer extrudate diameter.

7. A water-permeable PVC pipe suitable for irrigation purposes which is produced by a process according to claim 1.

8. A PVC pipe according to claim 7 having an initial water seepage rate at 1 bar water pressure of at least 1 liter/meter length/hour.

9. A PVC pipe according to claim 7 having an initial water seepage rate at 1 bar water pressure of 10 to 200 liters/meters length/hour.

* * * * *